United States Patent
Arp et al.

(10) Patent No.: US 8,815,326 B2
(45) Date of Patent: Aug. 26, 2014

(54) TEMPERATURE TELEMETRY IN PROCESSING OF MATERIAL

(75) Inventors: Zane A. Arp, King of Prussia, PA (US); Christine McDade, King of Prussia, PA (US)

(73) Assignee: GlaxoSmithKline LLC, Wilmington, New Castle, DE (US)

( * ) Notice: Subject to any disclaimer, the term of this patent is extended or adjusted under 35 U.S.C. 154(b) by 1008 days.

(21) Appl. No.: 12/670,084

(22) PCT Filed: Jul. 23, 2008

(86) PCT No.: PCT/US2008/070820
§ 371 (c)(1),
(2), (4) Date: Jan. 21, 2010

(87) PCT Pub. No.: WO2009/018028
PCT Pub. Date: Feb. 5, 2009

(65) Prior Publication Data
US 2010/0203227 A1    Aug. 12, 2010

Related U.S. Application Data

(60) Provisional application No. 60/952,347, filed on Jul. 27, 2007.

(51) Int. Cl.
G08C 19/00    (2006.01)
A61K 9/28    (2006.01)
C23C 16/52    (2006.01)

(52) U.S. Cl.
USPC ............. 427/2.14; 427/2.15; 427/8; 424/464; 424/474; 340/870.17; 340/870.11; 340/870.01

(58) Field of Classification Search
USPC ................. 427/2.1, 2.14, 2.15, 2.18, 8, 212; 340/870.17, 870.01, 870.11; 424/464, 424/474, 489, 490
See application file for complete search history.

(56) References Cited

U.S. PATENT DOCUMENTS

| | | | | |
|---|---|---|---|---|
| 3,582,921 | A * | 6/1971 | Krieger | 340/870.09 |
| 4,168,674 | A * | 9/1979 | Futter | 118/695 |
| 4,230,731 | A * | 10/1980 | Tyler | 426/233 |
| 4,255,137 | A * | 3/1981 | Guyer | 432/225 |
| 4,543,576 | A * | 9/1985 | Hieber et al. | 340/870.17 |
| 4,590,466 | A * | 5/1986 | Wiklund et al. | 340/870.28 |
| 4,844,076 | A * | 7/1989 | Lesho et al. | 600/302 |
| 5,023,108 | A * | 6/1991 | Bagaria et al. | 427/2.15 |
| 5,399,854 | A | 3/1995 | Dunphy et al. | |
| 5,415,181 | A * | 5/1995 | Hogrefe et al. | 600/549 |
| 5,607,697 | A * | 3/1997 | Alkire et al. | 424/495 |
| 6,646,567 | B1 * | 11/2003 | Olivas | 340/870.17 |
| 6,946,157 | B2 * | 9/2005 | Folestad et al. | 427/2.15 |
| 6,958,693 | B2 * | 10/2005 | Rothgeb et al. | 340/539.22 |
| 6,966,235 | B1 * | 11/2005 | Paton | 73/865.9 |

(Continued)

FOREIGN PATENT DOCUMENTS

JP    2008-0872135    4/2005

*Primary Examiner* — Cachet Sellman
(74) *Attorney, Agent, or Firm* — Dara L. Dinner; Theodore Furman

(57) ABSTRACT

In the process of coating pharmaceutical tablets in a moving bed, the temperature of the tablets is measured by incorporating a temperature transducer in the form of tablet into the bed of tablets, and transmitting temperature data to an external receiver by wireless telemetry.

10 Claims, 2 Drawing Sheets

(56) References Cited

U.S. PATENT DOCUMENTS

| | | | |
|---|---|---|---|
| 7,235,096 B1* | 6/2007 | Van Tassel et al. | 623/1.15 |
| 7,320,808 B2* | 1/2008 | Banko et al. | 426/231 |
| 7,426,413 B2* | 9/2008 | Balczewski et al. | 607/21 |
| 7,846,397 B2* | 12/2010 | Gregg et al. | 422/105 |
| 2003/0092975 A1 | 5/2003 | Casscells et al. | |
| 2004/0109936 A1* | 6/2004 | Banko et al. | 427/2.14 |
| 2006/0239331 A1* | 10/2006 | Schwegman | 374/179 |
| 2007/0012783 A1 | 1/2007 | Mercolino | |
| 2007/0027403 A1* | 2/2007 | Kosted | 600/549 |
| 2007/0211782 A1* | 9/2007 | Thompson | 374/120 |

\* cited by examiner

TEMPERATURE TELEMETRY IN PROCESSING OF MATERIAL

This application is the §371 national stage entry of International Application No. PCT/US2008/070820, filed 23 Jul. 2008, which claims priority to U.S. Ser. No. 60/952,347 filed 27 Jul. 2007.

FIELD OF THE INVENTION

This invention relates generally to processing of chemical products, and more particularly to a novel method for monitoring the temperature of a material being subjected to a processing step. The invention has particular utility in processing of pharmaceutical products, where monitoring of temperature during coating, drying, etc., can be a critical factor in maintaining consistent high product quality.

BACKGROUND OF THE INVENTION

In coating pharmaceutical dosage forms such as tablets, control of the temperature of the product bed is very important. Overheating can harm the product, and underheating can result in poor quality of the coating due, for example, to inadequate drying, or require substantially longer coating times.

In coating, the temperature of the product bed in a coating pan is typically controlled by monitoring an exhaust temperature and using the measured temperature value to control various coating units. It is well known that the measured exhaust temperature can vary widely depending on the position of the exhaust temperature probe relative to the coating pan, the design of the coater, and the sizes of the pipes that are routed to the exhaust ducts. Erroneous temperature measurement can occur especially when the portion of the piping leading to the temperature probe is long or of a large diameter, because, in either case, the large area of the piping can dissipate a significant amount of heat. The local environment can also have an effect on temperature measurements at the exhaust port because less heat is dissipated through the pipe on a warm day than on a cooler day. Because of the effects of heat dissipation, the use of exhaust temperature as an indication of coating conditions is not sufficiently reliable. Moreover, when an exhaust temperature probe is used, it is difficult to use temperature information derived from the operation of one coater to predict conditions within a different coater. A significant amount of experimentation is needed in order to correlate temperature measurements with coating conditions in any coater.

To avoid the problems with exhaust temperature measurement, some coating pans have temperature probes installed on an arm that holds the spray nozzle inside the coating pan. Although an arm-mounted temperature probe is much better than an exhaust temperature probe for process control, the probe does not adequately measure the product bed temperature. Because the probe is suspended in the air, it measures the temperature of the incoming air, but is not able to measure directly how the incoming air is affecting the tablets being coated. As in the case of an exhaust temperature probe, it is difficult to use temperature information derived from an arm mounted probe in one coater to predict conditions within a different coater.

Another method of measuring product bed temperature is to use an infrared thermometer. An infrared thermometer typically provides very accurate measurements of product bed temperature. However, because an infrared thermometer is affected by conducted heat, it cannot be installed permanently in the interior of a coating pan. Therefore, when an infrared thermometer is used, a door to the coating pan must be opened, and opening of the door results in a drop in the air temperature that can cool the product bed and adversely affect the coating operation. Furthermore, the temperature as measured by an infrared thermometer is an average temperature over an area, and does not necessarily correspond to the actual temperature of an individual tablet.

There has been a need for an accurate process for product bed temperature measurement that does not have the drawbacks of an exhaust temperature probe, a spray arm-mounted probe, or an infrared thermometer.

Although only a coating process has been mentioned so far, similar problems arise in measuring temperature in other processes such as drying, freeze drying, and production of low dosage pharmaceuticals by liquid dispensing technology (LDT).

SUMMARY OF THE INVENTION

In one of its broader aspects, the invention is a method of monitoring the temperature of material being subjected to processing step. The method comprises including, along with the material, a temperature monitoring transducer, and transmitting temperature data from the monitoring transducer by wireless telemetry to a receiver external to the mass of material. Where the material is a mass of material, the transducer can be embedded within the material. The method is particularly useful in the case of a material that is in motion during the processing step, for example, when the mass of material comprises multiple pharmaceutical dosage forms. The processing step can be, for example, a coating step, in which a coating material is sprayed onto pharmaceutical dosage forms while the dosage forms are being tumbled.

Plural temperature monitoring transducers can be embedded within a mass of material, and temperature data can be transmitted from the temperature monitoring transducers over independent wireless channels to a receiver external to the mass of material, so that the temperature of each transducer can be ascertained independently.

In accordance with another aspect of the invention the temperature of pharmaceutical dosage forms in a bed comprising multiple dosage forms in a random array being subjected to a processing step, is monitored by including a temperature monitoring transducer within the bed, and transmitting temperature data from the monitoring transducer by wireless telemetry to a receiver external to the bed. Preferably, the pharmaceutical dosage forms and the transducer are moved during the processing step, and the transducer is of a size, shape and weight such that its movement within the bed is substantially indistinguishable from the movement of the pharmaceutical dosage forms in the bed.

Because the temperature measurement technique in accordance with the invention improves temperature control, and can be used to prevent overheating, it is particularly suitable for use in measurement of the temperature of heat-sensitive biological materials, e.g. oral protein-peptide based materials, which are typically denatured at around 37° C., materials containing waxes, and other low-melting compounds.

Where the processing includes deposition of a drop of liquid on each tablet of an array of tablets and passing the array of tablets through a drying stage, the temperature monitoring transducer can be included in the array along with the tablets.

The temperature monitoring transducer can also be embedded within a mass of material being subjected to lyophilization.

DETAILED DESCRIPTION OF THE PREFERRED EMBODIMENT

In the following description, the terms "transducer" and "sensor tablet" are both used to refer to a wireless temperature transducer having a size, shape and weight, comparable to the size, shape and weight of a pharmaceutical tablet. However, unless otherwise qualified, the term "transducer" should be understood as encompassing wireless transmitting temperature transducers having various shapes, weights, sizes and characteristics other than those of a pharmaceutical tablet.

A preferred transducer capable of transmitting temperature data wirelessly to a receiver is described in U.S. Pat. No. 4,844,076 to Jeffery C. Lesho and Arthur F. Hogrefe. The entire disclosure of U.S. Pat. No. 4,844,076 is here incorporated by reference. Briefly, the technology described in the patent relates to an ingestible temperature monitoring capsule. Capsules of the kind described in the Lesho et al. patent are being used extensively in the United States to monitor the internal temperature of athletes at both the collegiate and professional level, as well as to measure the internal temperature of race horses.

The capsule contains a power source in the nature of a chemical cell (commonly referred to as a "battery") that provides DC power to a simple oscillator circuit. The oscillator includes a temperature sensitive piezoelectric crystal and an LC tank the inductor of which emits a near field magnetic signal the frequency of which varies with the temperature of the crystal. The oscillating magnetic field induces an alternating current in an external pick-up coil, and the pick-up coil is connected to a counter or computer that registers the temperature of the crystal in the capsule.

A capsule that is identical to, or substantially the same as, the capsule of U.S. Pat. No. 4,844,076, can be included among the capsules in a bed of capsules to be coated in a coating pan. With an external receiver coil coupled magnetically to the inductor of the LC tank in the capsule, the capsule can transmit a signal that accurately represents the temperature of the capsule itself to an external receiver, for display, for recordation, for control of air temperature, air flow, coating pan rotation, or other processing parameters, or for any combination of the foregoing.

The use of miniature temperature transmitting capsule affords a substantial improvement over other currently used method of temperature monitoring in coating applications. The capsule makes it possible to measure the temperature of the product in the coating pan directly and to a very high degree of accuracy as coating takes place. The receiver can be small in size, and can be transferred easily from one coating pan to another.

Figure 1:
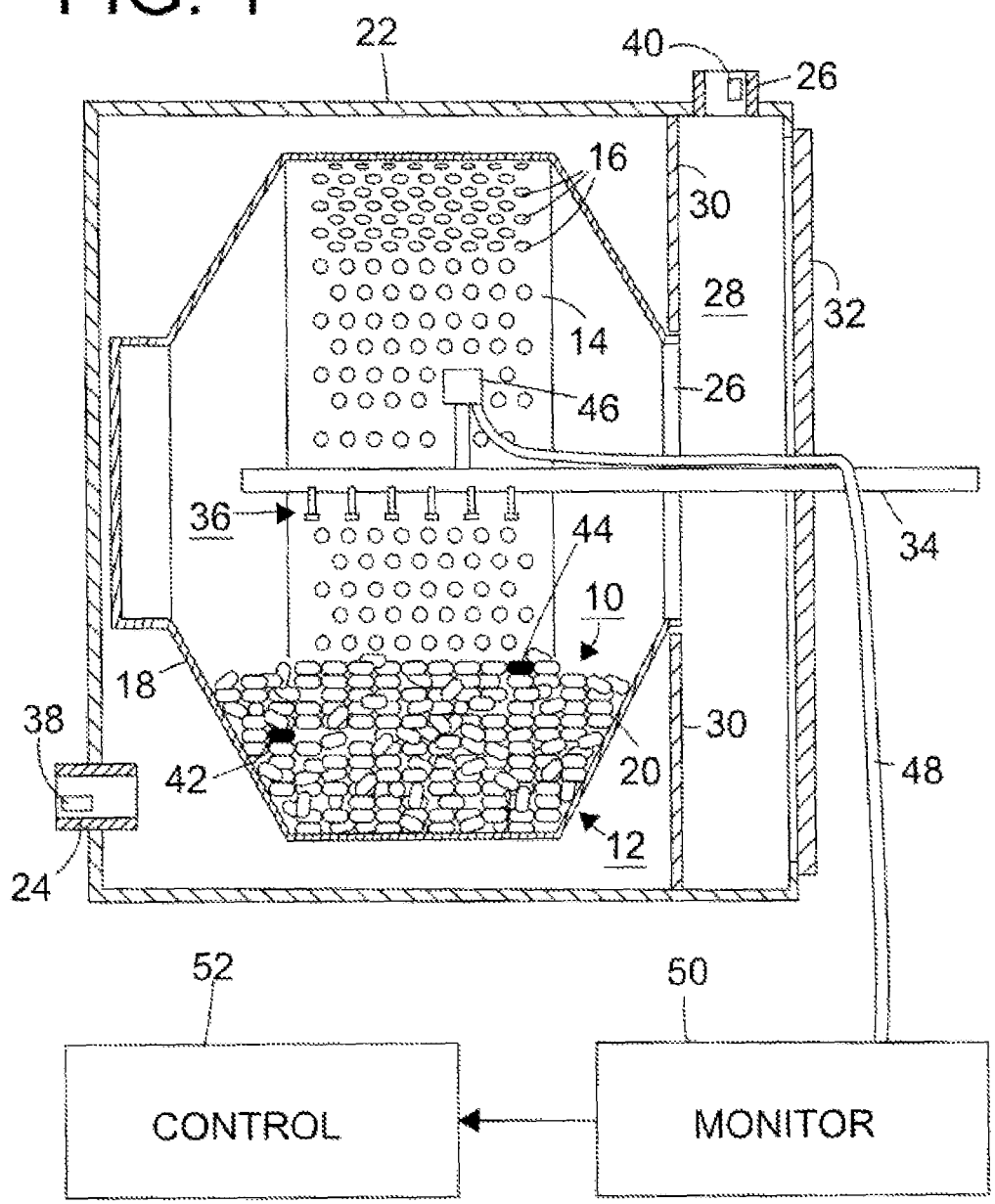
FIG. 1 is a schematic vertical section of a coating apparatus for carrying out the process of the invention.

As shown in FIG. 1, which illustrates a coating apparatus equipped to carry out the process of the invention, a bed 10 of pharmaceutical tablets to be coated is supported in a coating pan 12. The coating pan is in the form of a drum having a cylindrical central section 14. The cylindrical section of the drum shown in FIG. 1 has perforations 16 for the entry of air. In some coating pans, however, the cylindrical section does not have perforations. The drum also has frusto-conical sections 18 and 20 on opposite sides of the central section. The coating pan 12 is disposed in an enclosure 22, and rotatable within the enclosure about a horizontal axis about which the cylindrical section and the frusto-conical sections are symmetrical. The coating pan structure and the enclosure are conventional, and the coating pan is mounted within the enclosure, and rotatable, by a conventional mounting and drive mechanism (not shown). The enclosure 22 has an air inlet port 24, through which heated air is supplied by a conventional heated air supply, and an exhaust port 26. In the operation of the apparatus, heated air introduced through inlet port 24 passes through the perforations 16 of the cylindrical section 14 into the interior of the coating pan, where it comes into contact with the tablets in tablet bed 10 as the bed is tumbled by rotation of the coating pan. The air then passes through an opening 26 at one end of the coating pan to a channel 28 defined between a ring-shaped baffle 30 and door 32, and out through exhaust port 26. The coating pan can be loaded with tablets by opening door 32. One or more of the walls of the enclosure 22 can be hinged to allow removal and replacement of the coating pan.

A pipe 34, extends through the door 32 into the interior of the coating pan for delivery of coating material. On this pipe is mounted a set 36 of nozzles arranged to direct a spray of coating material onto the tablets 10 as they are tumbled by rotation of the coating pan.

The coating material can be any of a variety of known coating materials. In the case of pharmaceutical tablets, for example, a typical coating material is a combination of a polymer such as polyvinylpyrollidone (PVP) or hydroxypropylcellulose (HPC), together with a pigment and an opacifier such as titanium dioxide ($TiO_2$) in a suitable vehicle such as water or an organic solvent, which partially evaporates as the spray approaches the bed of tablets and continues to evaporate while in contact with the tablets, leaving a solid coating.

Conventional temperature probes 38 and 40 are provided in the air inlet and outlet ports 24 and 26 respectively, and these probes can be used in conjunction with the sensor tablet or sensor tablets incorporated into the tablet bed 10 to monitor process conditions.

One or more sensor tablets are incorporated into the tablet bed 10. In FIG. 1, two such tablets, 42 and 44, are shown. These sensor tablets are preferably of a size, shape and weight comparable to the size, shape and weight of the tablets to be coated, and, although these parameters are not critical for effective temperature measurement, the size, shape and weight of each sensor tablet should be such that its movement within the bed of tablets is substantially indistinguishable from the movement of the pharmaceutical dosage forms in said bed as the coating pan is rotated. Thus, the movement of the sensor tablets within the bed 10 should be essentially random, similar to the movement of the pharmaceutical tablets in the bed.

The sensor tablets, or transducers, transmit sensed temperature data by means of a near field, frequency modulated, oscillating magnetic signal to a pick-up 46, which can be conveniently mounted on pipe 34 so that it is in close proximity to the tablet bed 10. The pick-up is preferably composed of one or more coils in which an electric current is induced by the magnetic field generated by the sensor tablets. The induced current is carried by a cable 48 to a monitor 50, which can correspond to the receiver described in U.S. Pat. No. 4,844,076. The monitor can display the temperatures measured by the sensing tablets, and can also be connected to a control 52, which can be a computer-operated circuitry for controlling various operating parameters of the coating apparatus such as air temperature and/or humidity, air flow, coating pan rotation, coating material pressure, etc., in a manner similar to the manner in which an exhaust temperature probe is currently used to control coater operating parameters. The difference is that adjustments to the control are made to take into account the fact that the temperature measurement made by the sensor tablets is a direct, and nearly instantaneous, measurement of temperature conditions within the tablet bed, whereas an exhaust temperature probe provides only an indirect indication of those conditions that is either time-delayed or predictive, depending on whether heat is being transferred to the exhaust air by the tablets, or to the tablets by the heated air introduced through the air inlet port.

The process of the invention can be carried out using a single sensor tablet in the tablet bed, or multiple tablets. In the case of multiple tablets, the tablets should transmit data over different telemetry channels so that the temperature information from the several sensor tablets can be distinguished. Channels can be conveniently distinguished from one another by using different frequency bands, by utilizing different digital signatures, or by any of various other known techniques. In general, a single pick-up coil can be used for plural telemetry channels, and the channels can be distinguished from one another by suitable discriminating circuitry in the monitor 50.

Experiments were carried out using a CORTEMP ingestible core body thermometer as a sensor, and a CORTEMP model HT150001 temperature recorder. Both the sensor and the recording equipment are available from HQ Inc. of 210 9th Street Drive West, Palmetto, Fla. 34221 U.S.A. The sensor was originally intended to transmit core body temperature as it travels through the digestive tract. A 262 KHz near field magnetic signal, transmitted by the sensor is picked up by the recorder and is both displayed in real time and stored for later analysis.

A Vector 24 inch coating pan was used in the experiments. Its inlet and exhaust temperature were monitored and recorded using conventional monitoring equipment, while the CORTEMP recording equipment was used to monitor the temperature of the sensor at 10 second intervals.

The sensor was a modified version of a standard tablet used to monitor the internal body temperature of horses. The tablet is about the size of a large multi-vitamin tablet and was enshrouded in a silicone coating. The internal power source in the tablet was designed to supply current for at least approximately nine hours, but in practice was found to supply adequate power for as long as twenty four hours.

Because the ingestible equine temperature sensors have a limited range of only about 12-18 inches, the internal power supply voltage was increased in order to increase the range of the sensor to about 3-4 feet so that it could be used with almost all conventional coating pans.

In the initial tests, a single, unused, CORTEMP sensor was placed into each batch of tablets to be coated. Later, the sensors were washed and reused to test their longevity. The CORETEMP sensors were allowed to be coated along with the tablets.

In the experiments, the tablets, and the sensor, were subjected to the coating parameters specified in the following table:

TABLE 1

| | |
|---|---|
| Pan Size | 24" |
| Batch Size | 14 kg |
| Inlet Temperature Set Point | 58° C. |
| Spray Rate Set Point | 20 g/min |
| Air Flow Set Point | 220 cfm |
| Atomization Air Set Point | 20 psi |
| Pan Speed | 10 rpm |
| Inlet Bed Temperature | 37° C. |

Data from nine different coating runs were collected using the CORTEMP sensor for comparison with the separately recorded exhaust temperature. In each of the coating runs, the shape of the trend obtained with the CORTEMP sensor was very similar to the trend exhibited by the exhaust port temperature measurements.

Figure 2:
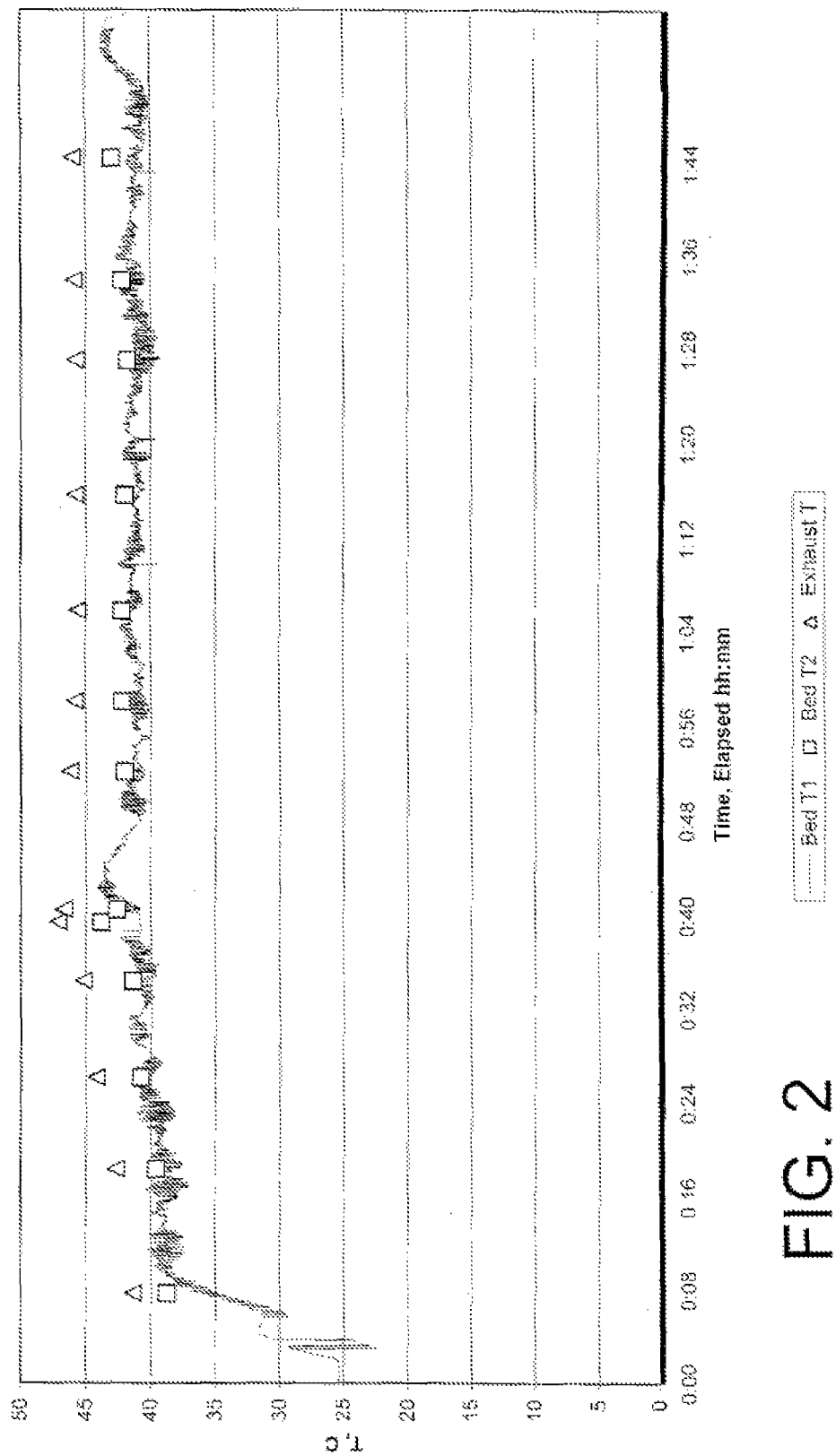
FIG. 2 is a graph showing temperature as measured over a time interval by a conventional temperature probe located at the exhaust port of the coating apparatus of FIG. 1, and also showing temperature as measured over the same time interval by a conventional infrared thermometer, and by the monitoring transducer in accordance with the invention.

As seen in FIG. 2, the average temperature of the tablets was slightly lower than the temperature measured at the exhaust. One reason for this phenomenon is that the tablets were being actively sprayed with a coating, and the vehicle carrying the coating was continuously evaporating from the surfaces of the tablets, causing evaporative cooling. On the other hand, the temperature as measured by the infrared thermometer was very consistent with the temperature as measured by the sensor tablet.

The temperature acquisition time in the pellet sensor can be adjusted, and, with an acquisition time of about two seconds, considerable instability in the recorded temperature was observed, with sharp downward spikes in the trace for pellet sensor temperature. This instability is believed to have been due to anomalies in the magnetic coupling between the pellet sensor and the magnetic pick-up. However, when the acquisition time was increased to ten seconds, the downward spikes were almost completely eliminated.

Temperature profiles derived from experiments have shown that the variation from a temperature set point is dependent on the stability of the coating cycle. In an unstable coating environment, the temperature throughout the coating process varies much more than in the case depicted in FIG. 2, where the coating environment was well controlled. For example, in one experiment, it was observed that the temperature in the tablet bed, as measured by the sensor tablet, was consistently higher than the temperature observed at the exhaust port of the coating apparatus. In that experiment, the system was being heated constantly in order to reach the set point temperature based on the response from the exhaust port. That is, air warmer than the set point was constantly being introduced to the coating bed, driving the coating bed temperature higher than the temperature registered by the exhaust temperature probe. The sensor tablet can be used to achieve tighter temperature control, which can be especially important in the application of enteric coatings.

The results of the tests on the CORTEMP temperature probe for monitoring coating operations show that the temperature profile observed with the probe closely resembles the temperature profile registered by an exhaust temperature probe with a few important differences. In all phases of coating the potential exists for the temperature of the tablet to depart significantly from the exhaust temperature. For example, in preheating, the temperature in the tablet bed can exceed the temperature at the exhaust port by as much as 10° C. Likewise, in drying, the temperature of the tablet can significantly exceed the temperature of the exhaust port. During coating, the temperature of the tablet can depart from the exhaust port temperature in either direction, depending on whether or not the coating apparatus is stabilized. Direct temperature measurement avoid these temperature measurement differences, and the ability of the sensor tablet to provide a direct temperature measurement can be crucial to products and coating operations in which temperature is critical to product quality.

In addition, larger coating units can be expected to exhibit larger temperature differentials between the actual temperature of the tablets in the coating pan and the exhaust port temperature. Thus, the use of temperature sensing tablets is likely to prove especially beneficial in the case of larger scale coating equipment. Furthermore, the ability of the sensor tablet to make a direct temperature measurement makes it much easier to scale up coating parameters determined from a small scale coating operation to production levels.

Although the process of the invention has been described in the context of tablet coating by a batch process using a rotating coating pan, the advantages of the process can be realized in tilted drum coaters, and also in the context of continuous coaters, i.e., devices utilizing rotating drums through which a supply of tablets moves continuously. Likewise, the process of the invention can be used with other forms of coating apparatus, such as a continuous or batch-type coater in which a bed of tablets is fluidized and tumbled by a flow of air or by vibratory motion. In a continuous coating process, temperature sensing tablets can be introduced periodically into a moving mass of tablets, and recovered at the outlet of the coater.

The utility of the invention is also not limited to coating of pharmaceutical tablets, or even to coating. For example the process of the invention has potential utility in coaters used in the manufacture of candy and food products. Furthermore the process of the invention may be used wherever, a process is being carried out in which the monitoring of temperature of a mass of material is required, and it impossible, inconvenient or impractical to insert a fixed probe into the mass of material.

The temperature measurement technique of the invention can also be used to advantage in the manufacture of low dose pharmaceutical products by means of liquid dispensing technology (LDT), such as disclosed in WO 2005/123569 and WO 2005/124297. In the manufacture of pharmaceutical tablets using Liquid Dispensing Technology, inert carrier tablets in matrix array plates are moved along conveyors. In a first stage, a drop of liquid containing an active pharmaceutical ingredient, which may include a polymer and/or other excipients is dispensed onto each of the inert tablets. The tablet arrays then move through a drying stage, in which heat is supplied in the form of forced hot air, infrared radiation, or both, to evaporate solvent. Tablet temperatures are currently monitored using an infrared temperature probe designed to provide a reading of the temperature at the surfaces of the tablets as they exit the drying stage.

In accordance with the invention, in LDT processing, wireless sensor tablets are provided in the matrix array plate alongside the in-process tablets. The sensor tablets wirelessly transmit real-time, continuous, temperature data throughout the drying stage instead of only providing an instantaneous reading of the tablet temperatures as they exit the drying stage. Wireless sensors can be used in LDT processing for temperature-mapping studies to gain a better understanding of the process. Moreover, the tracking of product heat history, which is made possible by the use of wireless sensors, can be particularly important in the processing of heat-labile compounds that are subjected to the higher temperatures required when the solvent being evaporated is water.

The temperature measurement technique of the invention can also be used in fluid bed drying and other operations in which heat is supplied to a material, e.g., high shear wet granulation, crystallization, precipitation, and fermentation. The temperature measurement technique of the invention can also be used in applications in which heat is removed from a material, e.g. lyophilization or "freeze-drying."

Many conventional drug substances destined for therapeutic use are unstable in aqueous solution, and must therefore be converted into solid products. Lyophilization is commonly used to achieve the desired product stability. However, lyophilization takes place in a series of stages: initial freezing, in which an aqueous solution of the drug is frozen; primary drying, in which a vacuum is applied and ice is sublimed; and secondary drying, in which residual moisture is removed by diffusion, desorption, and/or evaporation. It is important to monitor the temperature in each of these stages. However, lyophilization is frequently carried out while the product is in a sealed vial so that it is difficult or impossible to make a direct temperature measurement using a conventional probe. Moreover, the wires leading from a conventional wired probe can be a source of contamination. The incorporation of one or more wireless temperature sensors into the product throughout the lyophilization process makes it possible to achieve continuous, accurate, and direct temperature measurement while avoiding the difficulties associated with wired probes.

Various modifications can be made to the apparatus and process described. For example, in the tablet coater, the pick-up can be mounted outside the coating pan as long as it is capable of reliable reception of the signal generated by the sensor tablet. Although near-field magnetic telemetry is preferred, electromagnetic wave transmission, i.e., radio signals, can be utilized instead. It is even conceivable that, in some instances, acoustic signals or other means of wireless telemetry can be utilized. It is also possible to recharge the power source within a sensor tablet by inducing a current in a coil within the sensor tablet by means of a time-varying external magnetic field, and in some instances, the sensor tablet could be powered entirely by an external power source, obviating the internal chemical cell power source altogether. Temperature sensing capsules can also be made so that they operate as transponders, transmitting temperature data only when queried by an externally provided signal, thereby conserving power and extending their useful lives.

Still other modifications may be made to the apparatus and method described above without departing from the scope of the invention as defined in the following claims.

What is claimed is:

1. A method of monitoring the temperature of a mass of pharmaceutical dosage forms being subjected to a processing step in which said mass of pharmaceutical dosage forms is caused to flow, the method comprising:

including within said mass of pharmaceutical dosage forms a temperature monitoring transducer said transducer being freely movable relative to each of the pharmaceutical dosage forms within said mass; and while said mass of pharmaceutical dosage forms is flowing, transmitting temperature data from said monitoring transducer by wireless telemetry to a receiver external to said mass of pharmaceutical dosage forms;

wherein the temperature monitoring transducer moves within said mass of pharmaceutical dosage forms during said processing step;

wherein the size, shape and weight of the temperature monitoring transducer are such that its movement within said mass of pharmaceutical dosage forms is substantially indistinguishable from the movement of said dosage forms; and wherein said temperature monitoring transducer is a non-pharmaceutical device consisting essentially of an external shell, and, within said external shell, a temperature sensor, a wireless transmitter, and electronic circuitry causing the wireless transmitter to transmit data corresponding to the temperature as sensed by the temperature sensor.

2. The method according to claim 1, in which the processing step is a coating step.

3. The method according to claim 1, in which the processing step is a coating step in which a coating material is sprayed onto the pharmaceutical dosage forms while the pharmaceutical dosage forms are being tumbled.

4. The method according to claim 1, in which plural temperature monitoring transducers are embedded within said mass of pharmaceutical dosage forms, said temperature monitoring transducers being freely movable relative to one another and to each of the pharmaceutical dosage forms within said mass, and temperature data are transmitted from said temperature monitoring transducers, by wireless telemetry, to a receiver external to said mass of pharmaceutical dosage forms, and in which each of said temperature monitoring transducers is a non-pharmaceutical device consisting essentially of an external shell, and, within said external shell, a temperature sensor, a wireless transmitter, and electronic circuitry causing the wireless transmitter to transmit data corresponding to the temperature as sensed by the temperature sensor.

5. The method according to claim 1, in which plural temperature monitoring transducers are embedded within said mass of pharmaceutical dosage forms, said temperature monitoring transducers being freely movable relative to one another and to each of the pharmaceutical dosage forms within said mass, and temperature data are transmitted from said temperature monitoring transducers over independent wireless channels to a receiver external to said mass of pharmaceutical dosage forms, whereby the temperature of each transducer can be ascertained independently, and in which each of said temperature monitoring transducers is a non-pharmaceutical device consisting essentially of an external shell, and, within said external shell, a temperature sensor, a wireless transmitter, and electronic circuitry causing the wireless transmitter to transmit data corresponding to the temperature as sensed by the temperature sensor.

6. A method of monitoring the temperature of pharmaceutical dosage forms in a bed comprising multiple dosage forms in a random array being subjected to a processing step in which said dosage forms are being tumbled, the method comprising:

including a temperature monitoring transducer within said bed, said transducer being freely movable relative to each of the pharmaceutical dosage forms within said bed; and transmitting temperature data from said monitoring transducer by wireless telemetry to a receiver external to said bed;

wherein the temperature monitoring transducer moves within said dosage forms as the dosage forms are being tumbled;

wherein the size, shape and weight of the temperature monitoring transducer are such that its movement within said dosage forms is substantially indistinguishable from the movement said dosage forms while said dosage forms are being tumbled; and wherein said temperature monitoring transducer is a non-pharmaceutical device consisting essentially of an external shell, and, within said external shell, a temperature sensor, a wireless transmitter, and electronic circuitry causing the wireless transmitter to transmit data corresponding to the temperature as sensed by the temperature sensor.

7. The method of claim 6, in which the processing step is a coating step.

8. The method according to claim 6, in which the processing step is a coating step in which a coating material is sprayed onto the pharmaceutical dosage forms and the transducer while the pharmaceutical dosage forms are being tumbled.

9. The method according to claim 6, in which plural temperature monitoring transducers are included within said bed, said temperature monitoring transducers being freely movable relative to one another and to each of the pharmaceutical dosage forms within said bed, and temperature data are transmitted from said temperature monitoring transducers, by wireless telemetry, to a receiver external to said bed, and in which each of said temperature monitoring transducers is a non-pharmaceutical device consisting essentially of an external shell, and, within said external shell, a temperature sensor, a wireless transmitter, and electronic circuitry causing the wireless transmitter to transmit data corresponding to the temperature as sensed by the temperature sensor.

10. The method according to claim 6, in which plural temperature monitoring transducers are included within said bed, said temperature monitoring transducers being freely movable relative to one another and to each of the pharmaceutical dosage forms within said bed, and temperature data are transmitted over independent wireless channels from said temperature monitoring transducers to a receiver external to said bed, whereby the temperature of each transducer can be ascertained independently, and in which each of said temperature monitoring transducers is a non-pharmaceutical device consisting essentially of an external shell, and, within said external shell, a temperature sensor, a wireless transmitter, and electronic circuitry causing the wireless transmitter to transmit data corresponding to the temperature as sensed by the temperature sensor.

* * * * *